United States Patent [19]

Billhartz

[11] 4,388,670

[45] Jun. 14, 1983

[54] BYPASS AND METER RELEASE FOR WATTHOUR METER SOCKET

[75] Inventor: Larry E. Billhartz, Portland, Oreg.

[73] Assignee: Siemens-Allis, Inc., Atlanta, Ga.

[21] Appl. No.: 264,938

[22] Filed: May 18, 1981

[51] Int. Cl.³ .............................................. H02B 9/00
[52] U.S. Cl. .................................. 361/367; 361/374; 200/51 R; 200/51.1; 339/75 M
[58] Field of Search .............. 361/364, 366, 367, 368, 361/372, 374, 375; 339/19, 45 R, 45 A, 75 M, 273 R, 274; 200/51 R, 51.09, 51.1; 324/110, 149

[56] References Cited

U.S. PATENT DOCUMENTS 2,231,737  2/1941  Rutter ................................ 361/367
3,003,085  10/1961  Rund ............................... 339/75 M
3,962,610  6/1976  Reed ................................. 361/367

*Primary Examiner*—G. P. Tolin
*Attorney, Agent, or Firm*—F. W. Powers, III

[57] ABSTRACT

A watthour meter socket assembly of the type which engages the blades of a watthour meter. The blades are frictionally held by pairs of spring-loaded conductive jaws, which form the female contacts of the socket assembly. Helper springs are provided to increase the biasing of the jaws. In order to provide a conductive bypass when the meter is removed for servicing or replacement a reciprocable, conductive blade is mounted on a slide mechanism so that it can be wedged between the jaws. The wedging action simultaneously spreads the jaws apart, allowing removal of the meter.

9 Claims, 4 Drawing Figures

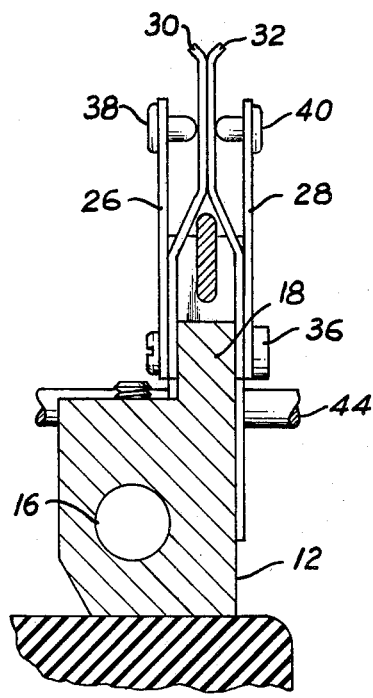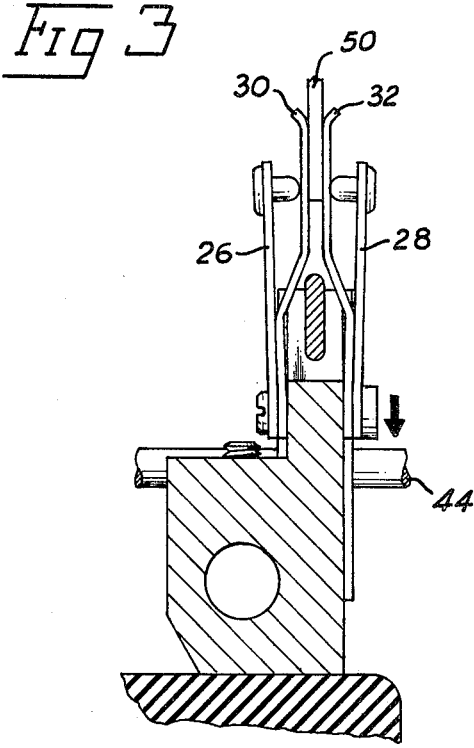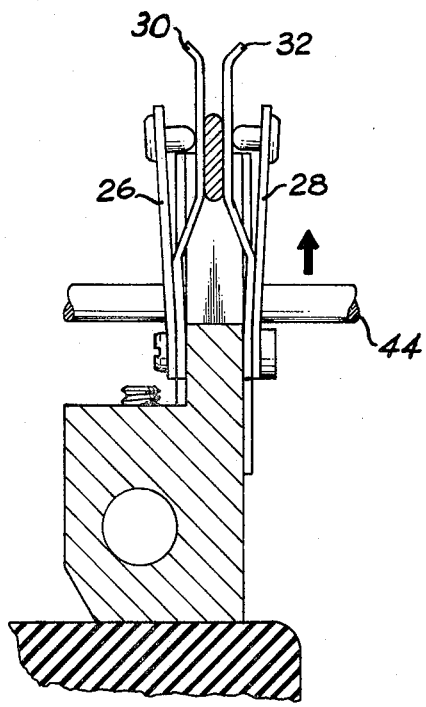

BYPASS AND METER RELEASE FOR WATTHOUR METER SOCKET

BACKGROUND OF THE INVENTION

The present invention relates to watthour meter sockets and, more specifically, to an improved mechanism for simultaneously bypassing the meter and facilitating its release from the socket assembly.

Although there are various approaches to the mounting of a watthour meter in an appropriate socket, the most prevalent approach for the mounting of self-contained watthour meters is to provide meter terminals in the form of conductive blades which protrude from the back of the meter, and provide friction-fit female mountings to receive them. Metal jaws are conventionally provided for this purpose, spring-loaded so as to grip the conductive blades to both hold the meter securely, and to provide good electrical contact.

As such meters are used in great numbers installation, testing, and replacement are common. In order to simplify the installation and replacement procedure various designs have been advanced which will allow a meter to be manually removed and replaced without the use of special tools. In addition, various approaches have been tried for maintaining circuit continuity by bypassing or "jumpering" the meter contacts when the meter is removed.

A number of prior art designs have been developed in order to provide mechanisms which will facilitate the clamping and release of a watthour meter, while simultaneously providing for the "jumpering" of the terminals. In one approach, separate conductive links or jumpers were manually attached by a serviceman to bypass the meter, before its removal. Later developments of meter sockets saw the provision of links within the sockets which could be easily moved to bypassing position wherein they connected adjacent socket terminals. More recently, mechanisms have been provided comprising jumper bars coupled to a lever or the like whereby the jumper bars could be moved into bypassing position across the appropriate terminals, simultaneously relieving the clamping pressure upon the watthour blades so that they could be more easily released. One example of such a construction is disclosed in U.S. Pat. No. 3,003,085 wherein an off-center crossbar, or a crank moves an insulative slide which carries a conductive jumper bar. When in jumpering position the bar causes spring-loaded rigid metal jaws to pivot, spreading them apart and relieving the clamping pressure upon the meter blades. With still another approach spring-loaded jumper bars are forced together to provide the needed bypass by the same "wedging" mechanism which relieves the spring pressure upon the meter blades.

To provide good electrical contact with meter blades, it is highly preferable to form the jaw members from copper alloy. However, owing to the heavy, rigid design of prior art releasable jaw members, the expense of making them of copper alloy is prohibitive. For this reason, such members are conventionally made from aluminum extrusions. Copper alloys are still desirable not only for providing contact with meter blades, but also for obtaining a good contact with a bypass bar which would in some cases at least avoid the need for a separate jumpering mechanism. Therefore, it will be seen that it would be desirable to provide a bypass-type watthour meter socket which utilizes jaws of a thin conductive material such as copper alloy. An additional benefit accompanying the use of thin, flexible material is the ability of the jaws to conform to distorted or misaligned meter blades.

An object of the present invention is to provide a bypass meter socket assembly utilizing releasable jaws which are constructed of thin conductive material.

Another object is to provide an improved meter socket assembly which provides a clear, visible indication when bypassed.

Still another object is to provide an improved meter bypass and release mechanism.

SUMMARY OF THE INVENTIONS

Briefly stated, in accordance with one aspect of the invention the foregoing objects are achieved providing a pair of electrically separate, substantially rigid lugs adapted to receive electrical conductors from a source of electric power, and from a circuit to be supplied. A pair of leaf springs is attached to each of the lugs, and between the leaf springs are disposed a pair of flexible, conductive jaws. Each leaf spring has means extending inwardly which bears upon the adjacent jaw, thereby biasing the jaws together so that they will tightly engage a watthour meter blade. A slide is disposed between lugs and a jumpering bar attached thereto, extending between pairs of jaws. When the slide is moved upwardly, the jumpering bar wedges between each pair of jaws, forcing them open and releasing the meter blade. At the same time, the jumpering bar establishes an electrical path between the pairs of jaws so that the meter may be removed without interrupting the circuit.

In a presently preferred embodiment, a pair of leaf springs are provided, the springs lying at opposite sides of each pair of jaws. Location of the slider may be accomplished by capturing it between the ends of adjacent lugs. The slider is preferably operated by means of an offset rod or crank, which is coupled to a manually-operable handle.

BRIEF DESCRIPTION OF THE DRAWINGS

While the specification concludes with claims particularly pointing out and distinctly claiming the subject matter which is regarded as the invention, It is believed that the invention will be better understood from the following description of a preferred embodiment taken in conjunction with the accompanying drawings in which:

FIG. 2 is a sectional view taken on II—II of FIG. 1; and

FIGS. 3 and 4 are views similar to FIG. 2, showing the movable elements of the socket assembly in various positions.

DESCRIPTION OF A PREFERRED EMBODIMENT

Figure 1:
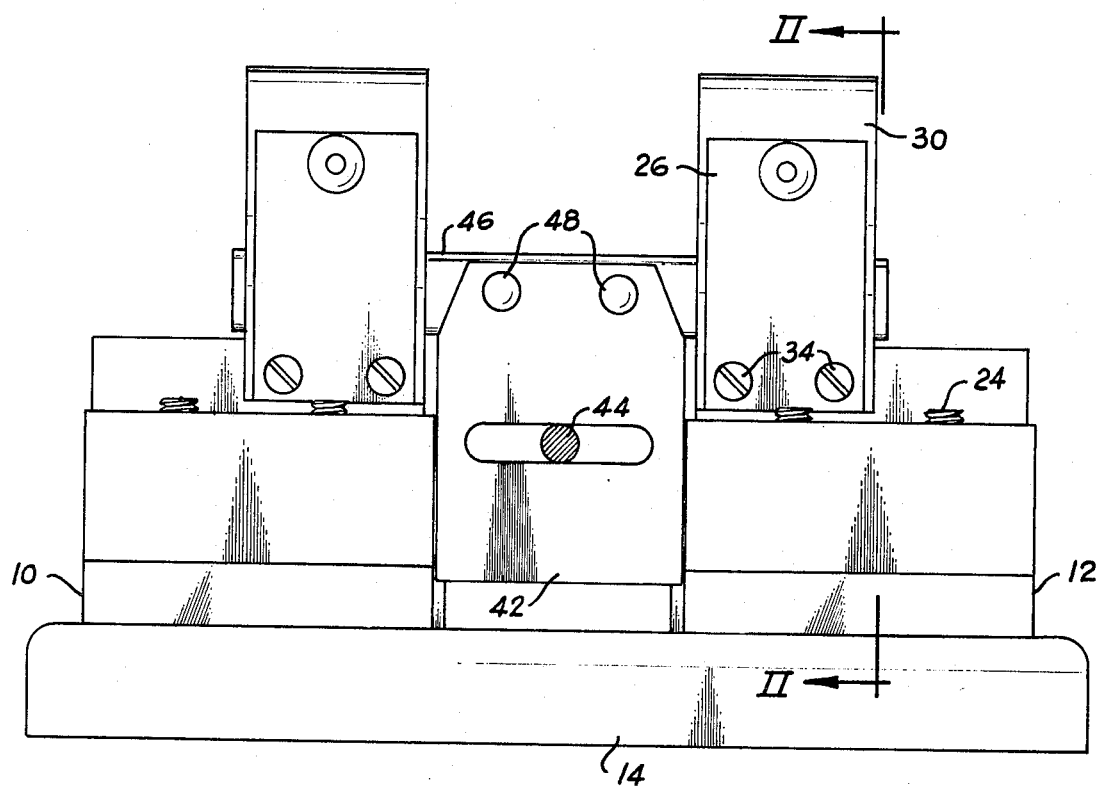
FIG. 1 is a side elevation of a bypass-type watthour meter socket incorporating the present invention.

In FIG. 1 there is shown a meter socket assembly which comprises a pair of electrically separate lugs 10 and 12 firmly mounted upon an insulating base 14 which may be conventionally formed by molded plastic or the like. As can be seen from FIGS. 1 and 2 the lugs are generally conventional in nature, and may be formed of an aluminum extrusion including a cavity 16 in which an electrical cable may be clamped. Clamping screws 24 serve to clamp the cable (not shown) securely within the lug.

As the members associated with each lug are substantially identical, only the members coupled with right-hand lug 12 will be specifically discussed. Upstanding from either side of each lug are a pair of leaf springs 26, 28 and captured between the leaf springs are a pair of flexible jaws 30, 32. The jaws and spring members are clamped to the lug by appropriate means such as screws 34 which pass through lug 12 and are threaded into plate 36.

At the upper end of each leaf spring there is provided means extending inwardly for applying the spring pressure to jaws 30 and 32. In a presently preferred embodiment such means take the form of rivets 38 and 40, although it will be understood that other approaches may be taken such as deforming the upper end of each leaf spring so as to cause it to bear directly upon the adjacent jaw.

A slide 42 is disposed between lugs 10 and 12 and constrained to move vertically at the urging of a crank member 44. While shown in section form in the illustrations, member 44 may be an offset portion of a steel rod which is rotatable by means of a lever of the like to cause slide 42 to reciprocate. At the upper end of the slide is a conductive bypass bar 46. The bar is firmly attached to the slide by means of rivets 48 or other appropriate means. As the bar 46 from time to time carries electric current, it must be insulated from member 44 by appropriate insulation material, or, as in the preferred embodiment, by slide 42 which is made of an insulative material such as laminated polyester.

Owing to the force exerted by the leaf springs upon the jaws therewithin, insertion of the contact blade 50 of a meter as illustrated in FIG. 3 is difficult. In order to allow the blades of a meter to be readily inserted between the jaws of the illustrated socket assembly crank 44 is urged upwardly, moving slide 42 and thus bypass bar 46 upwardly from the position shown in FIG. 2 to cause the bar to engage the inner surfaces of jaws 30, 32. The continued upward movement of slide 42 forces bar 46 further between the jaws, wedging them apart and forcing springs 26 and 28 to separate as shown in FIG. 4. When the jaws are in this position the bypass bar is readily visible and thus the "bypassed" status of the assembly is evident to an electrician or installer.

Since bar 46 is made of conductive material, preferably copper, as soon as its ends engage the pairs of jaws a conductive path is established from one pair of jaws to the other. Assuming that an energized cable is clamped in lug 10, and a cable from a load circuit clamped in lug 12, a circuit is then established and power can flow directly to the load circuit whether or not a watthour meter is in place.

With the jaws wedged apart, a watthour meter can easily be installed simply by inserting the contact blades thereof into the corresponding set of jaws of the meter socket assembly. In a preferred embodiment jumper bar 46 is at least as thick, or slightly thicker, than blade 50 so that the blade slips easily into place between the conductive jaws. If crank 44 is now moved back to its original position, it urges slide 42 and thus jumper bar 46 downwardly and out of engagement with the jaws. As shown in FIG. 3, the jaws are then urged tightly together by the leaf springs, clamping them against the sides of blade 50 in order to secure the blade and to provide a good electrical contact. Due to the wedging and releasing action of bar 46 the springs can cause the blade 50 to be gripped much more tightly than would be the case if the blade had to be removed and inserted manually with no means to relieve the spring pressure.

While it will be readily understood that slide 42 may be located by any convenient means in the presently preferred embodiment a vertical groove was milled in the opposite edges of the slide, which receive the ends of lugs 10 and 12. The slide was made of a laminate substantially thicker than the lugs. Accordingly, the ends of the lugs provide a simple vertical way or track for guiding the slide. Depending upon the dimensions of the various members, stops can be provided at convenient points to limit the travel of the slide. Other conventional structural features may be incorporated by those skilled in the art when needed to satisfy particular design criteria.

It will now be seen that the present invention allows the use of relatively thin, flexible jaws for engaging the blades of a watthour meter. As it is highly desirable to use copper for such electrical contacts, the present invention provides a substantial reduction in cost over prior art approaches which required heavy, rigid jaw members. The lack of resiliency of the copper is compensated for by the presence of the illustrated leaf springs which act in the manner of "helper" springs to urge the copper jaw members toward each other.

The present design allows a relatively malleable material to be used for the jaws since the tendency of the latter to be deformed by the physical forces involved can be avoided by proper proportioning of the jaws. As can be seen in FIGS. 2, 3 and 4 in the preferred embodiment jaws 30, 32 are formed so that they include generally parallel portions which lie flat against each other and form a zone in which a meter blade is received. By keeping the zone relatively short, bending of the jaws due to the wedging action of the jumper bar 46 is avoided. For a given application the precise dimensions of the zone will depend upon a number of factors including the width, type, and thickness of the jaw material. The portions of the jaws below the blade-receiving, parallel portion are bent outwardly so as to diverge from one another, forming an opening in which jumper bar 46 may rest without coming into contact with the jaws themselves.

As will be evident from the foregoing description, certain aspects of the invention are not limited to the particular details of the examples illustrated, and it is therefore contemplated that other modifications or applications will occur to those skilled in the art. It is apparent, for example, that while only one pair of lugs and associated jaws was illustrated in the present description, additional jaws and/or lugs, or lugs of various configurations, may be provided for use in combination with the disclosed mechanism. It is accordingly intended that the appended claims shall cover all such modifications and applications as do not depart from the true spirit and scope of the invention.

What is claimed as new and desired to be secured by a Letters Patent of the United States is:

1. A meter socket assembly for releasably securing conductive blades of a watthour meter, comprising:
   a pair of electrically separate lugs for receiving electrical conductors;
   at least one leaf spring upstanding from each of said lugs;
   a pair of conductive jaws upstanding from each of said lugs, said jaws being disposed adjacent at least one said leaf spring and including first, generally parallel portions approaching and aligned with one another to form a blade-receiving zone, and second portions more widely spaced apart than said first portions to form a zone for receiving a bypass bar;

means extending from said leaf springs to apply pressure to said conductive jaws intermediate the ends of the first, parallel portions thereof for biasing said jaws together;

bypass means for providing an electrical path between pairs of said jaws including a slide disposed between said lugs and a conductive bypass bar affixed thereto and having ends extending between ones of said pairs of jaws in said bypass-receiving zone;

said slide being movable in a direction generally parallel to said jaws for urging said conductive bypass bar between said first, generally parallel portions of said jaws in order to separate said portions;

whereby a conductive path is established between pairs of said jaws and said jaws are separated sufficiently to allow conductive blades captured therebetween to be withdrawn.

2. In a meter socket assembly for releasably securing conductive blades of a watthour meter including at least one pair of electrically separate lugs for receiving electrical conductors and reciprocating means for simultaneously electrically bypassing a meter and releasing the conductive blades thereof from the socket assembly, the improvement comprising:

a pair of leaf springs upstanding from each of said lugs;

a pair of flexible conductive jaws affixed to each of said lugs and upstanding therefrom, said jaws being disposed between said leaf springs and including first, generally parallel closely-spaced portions forming a blade-receiving zone and second more distantly-spaced portions forming a bypass-receiving zone; and means extending inwardly from said leaf springs to apply pressure to said conductive jaws intermediate the ends of said first portions thereof for biasing said jaws together;

bypass means including a reciprocable slide disposed between ones of a pair of said lugs and a bypass bar attached to said slide and having opposed ends extending into the bypass-receiving zones of said jaws; and, means for reciprocating said slide to urge said bypass bar between said first, parallel portions of said jaws in order to establish electrical contact between pairs of said jaws and to separate said parallel portions thereof for releasing watthour meter blades encaptured therebetween.

3. A meter socket assembly for releasably securing conductive blades of a watthour meter, comprising:

a pair of electrically separate, rigid metal lugs for receiving electrical conductors;

a pair of leaf springs upstanding from each of said lugs;

a pair of flexible conductive jaws affixed to each of said lugs and upstanding therefrom, said jaws being disposed between said leaf springs and including first, generally parallel portions approaching and aligned with one another to form a blade-receiving zone, and second portions contiguous to said first portions and more widely spaced apart than said first portions to form a zone for receiving a bypass bar therein;

means extending inwardly from said leaf springs to apply pressure to said conductive jaws intermediate the ends of the first, parallel portions thereof for urging said jaws tightly together;

bypass means for providing an electrical path between pairs of said jaws including a slide disposed between said lugs and a conductive bypass bar affixed thereto and having ends extending between ones of said pairs of jaws in said bypass-receiving zone;

said slide being movable in the direction generally parallel to said jaws for urging said conductive bypass bar between said first, parallel portions of said jaws in order to separate said portions;

whereby a conductive path is established between pairs of said jaws and said jaws are separated sufficiently to allow conductive blades captured therebetween to be withdrawn.

4. The invention defined in claim 3, wherein said slide is formed of an insulative material and further including means for slidably locating said slide between ones of a pair of lugs.

5. The invention defined in claim 4, wherein said means extending from said leaf springs comprise abutments upstanding generally perpendicular to the plane of each of said leaf springs.

6. The invention defined in claim 3, including means for urging said slide in a direction generally parallel to said jaws comprising a crank arm.

7. The invention defined in claim 3, wherein ones of said jaws and the leaf springs adjacent thereto is fastened upon either side of each of said lugs.

8. The invention defined in claim 3, wherein said means extending inwardly from said leaf springs abut said conductive jaws substantially in the center of the first, parallel portions thereof.

9. The inventions defined in claim 3, wherein said bypass bar has a transverse thickness substantially equal to the thickness of a watthour meter blade to be received, for urging said jaws apart a distance approximately equal to the thickness of the blade.

* * * * *